Patented Feb. 12, 1946

2,394,586

UNITED STATES PATENT OFFICE 2,394,586

PURIFICATION OF LANTHANUM SALTS

Albert E. Ballard, Oak Ridge, Tenn., and Lawrence E. Martinson, Rochester, N. Y., assignors to Eastman Kodak Company, Rochester, N. Y., a corporation of New Jersey No Drawing. Application August 19, 1944, Serial No. 550,312

2 Claims. (Cl. 23—102)

This invention relates to the purification of rare earth compounds and to glass made therefrom. More particularly, it relates to the preparation of lanthanum oxide ($La_2O_3$) suitable for preparing color-free optical glasses. While this application parallels in some respects, our previous Patent No. 2,364,613, issued on December 12, 1944, it is an improvement thereover in the oxidizing agent employed and the manner of employing it.

The sources of lanthanum are the various rare earth containing minerals such as the monazite sands from which the lanthanum is separated by methods which are described in some detail in the literature. While the lanthanum can be obtained in relatively pure salt forms by repeated recrystallizations, these salts ordinarily still retain small amounts of impurities in the form of iron salts and the more closely related cerium salts. The elimination of the last traces of these and other impurities has been accomplished heretofore only with considerable difficulty and expense. This has been particularly true in the case of the soluble double salt of ammonium lanthanum nitrate, which fact has restricted its usefulness as a source of lanthanum oxide in the art of making certain optical glasses. It has been our experience that the presence of even very small traces of iron and cerium in the lanthanum oxide results in glasses having a distinctly yellow or amber color. For example, an amount of cerium oxide ($CeO_2$) no greater than 0.1% by weight based on the weight of the glass, gives a yellow colored glass with materials which normally in the absence of any cerium would yield a practically colorless product. Iron impurities give amber colored glasses. It will be appreciated that the presence of appreciable color in certain optical glasses would make such glasses impractical of use in systems where the absence of color is a critical requirement. We have now found that this disadvantage can be overcome by our new process of purification. Lanthanum salts such as the acetate, bromate, bromide, chloride, nitrate, and the like, which contain iron and cerium as impurities, can be rendered sufficiently free of these elements by our process so that the lanthanum oxide and the glasses derived therefrom are free from all objectionable color.

It is an object of our invention, therefore, to provide a method for the preparation of pure lanthanum oxide. Another object is to prepare the pure lanthanum oxide from the double salt of ammonium lanthanum nitrate. A further object is to prepare lanthanum oxide which is suitable for making practically colorless optical glass.

In the preferred method of carrying out of the process of our invention, ordinarily we start with the soluble double salt of ammonium lanthanum nitrate, as obtained by the usual extraction methods from monazite sands and purification by repeated recrystallizations, dissolve it in water to approximately a 25 per cent solution (ratio of weight of salt to total weight of all ingredients of the solution), add solid ammonium carbonate, and heat the solution close to the boiling point, add ammonium persulfate and heat the final solution to boiling. At first (upon adding the ammonium carbonate) some white lanthanum carbonate is precipitated, but as the solution approaches the boiling point and the ammonium persulfate is added, there is a gradual additional precipitation in the form of a light yellow, easily filterable, precipitate of iron and cerium. After settling for a short time, the solution is filtered, and the filtrate either evaporated to dryness and the residue ignited directly to the lanthanum oxide, or preferably, the filtrate is treated with oxalic acid and the precipitated lanthanum oxalate filtered off and ignited to the lanthanum oxide. The latter is employed directly in admixture with other metallic oxides to form optical glasses having the composition and properties such as those described by Eberlin and De Paolis, in their U. S. Patent No. 2,241,249, issued May 6, 1941.

In our process, the ammonium persulfate converts any cerium or iron to the higher oxidized form and need be employed in excess only slightly greater than that required for this conversion. The ammonium carbonate neutralizes the nitric acid, or any other mineral acid, which may be present in the particular lanthanum salt to be purified, and is employed in an amount sufficient merely to raise the pH to the point necessary to neutralize all the mineral acid and to precipitate a small amount of lanthanum carbonate which can be returned to the system, in the next batch to be purified. The iron is precipitated as a hydroxide, whereas the cerium is precipitated in some complex form of easily filterable hydroxide and carbonate. The reaction itself will not take place at ordinary room temperature, but only at temperatures approaching the boiling point of the solution, i. e. in excess of 80° C. A distinct advantage possessed by our process is that all the reagents employed are volatile and easily eliminated in the subsequent step of ignition of the lanthanum oxalate to the oxide.

The invention is illustrated further by the following example:

Example 300 grams of double ammonium lanthanum nitrate salt ($La(NO_3)_3 \cdot 2NH_4NO_3 \cdot 4H_2O$) containing cerium equivalent to 0.14 per cent $CeO_2$ were dissolved in 1000 cc. of water; 2.9 grams of ammonium carbonate were added with stirring. The solution was heated to 90° C.; 5 grams of ammonium persulfate were then added and the heating continued to the boiling point. The precipitate was allowed to settle for a short time and then filtered off, and the filtrate treated with a slight excess of oxalic acid to precipitate the lanthanum as the insoluble lanthanum oxalate. The latter was filtered off and ignited, thereby yielding a very pure lanthanum oxide. A glass prepared from a mixture consisting on a weight basis of 26% of the above prepared lanthanum oxide, 18% tungsten oxide, 12% thorium oxide, 12% barium oxide and 32% boric oxide was practically colorless, whereas the glass control sample prepared in the same way, but employing lanthanum oxide prepared without the benefit of the intermediate step of our invention from the same double salt was very yellow in color.

While our invention has been illustrated more particularly with a double salt of ammonium lanthanum nitrate containing cerium equivalent to 0.14 per cent $CeO_2$ as an objectionable impurity, and is primarily concerned with quantities of cerium and iron of this order or even less, it will be understood that our process is likewise applicable if desired, to the purification of soluble lanthanum salts containing many times this amount of impurities. For larger amounts of iron and cerium, it is only necessary to increase the quantity of reagents employed. Also the solution concentration of the salt to be purified is not at all critical, since concentrations as low as 5 per cent or even less, as well as concentrations somewhat higher than 25 per cent can be successfully employed, such higher concentrations being limited only by the solubility of the particular lanthanum salt to be purified.

The improvement constituting the instant invention distinguishes from the invention of our prior application in the use of ammonium persulfate instead of hydrogen peroxide, as the oxidizing agent, and more specifically in adding the oxidizing agent to the hot solution of the other ingredients. While the use of hydrogen peroxide accomplished its intended purpose, it was found that upon large scale operations it was sometimes necessary to repeat the oxidation and filtration, whereas when employing ammonium persulfate and particularly when adding it to the hot solution of the other ingredients, complete precipitation of the iron and cerium impurities took place in one operation without any necessity to repeat the process. The ammonium carbonate and ammonium persulfate may, of course, be added simultaneously to the cold solution and the solution then heated or may be added to the hot aqueous solution of the lanthanum salt and then the solution further heated, but better results seem to be obtained if the ammonium carbonate is added first so as to insure substantial neutrality of the solution, before adding the ammonium persulfate, the latter being preferably added to the solution while hot and then the solution being further heated.

We claim:

1. The process of removing iron and cerium from water-soluble lanthanum salts which comprises treating an aqueous solution of such a salt with sufficient ammonium carbonate to neutralize any free acid ions present and to just start to precipitate lanthanum carbonate, adding to such solution an excess of ammonium persulfate over the amount required to convert the iron and cerium ions present to the higher oxidized state, heating the solution to a temperature approaching the boiling point thereof and filtering off the insoluble compounds of iron and cerium so formed.

2. The process of removing iron and cerium from the double salt of ammonium lanthanum nitrate which comprises treating an aqueous solution of such salt with sufficient ammonium carbonate to neutralize any free acid ions present and to just start to precipitate lanthanum carbonate, heating the solution to a temperature above 80° C., then adding to such solution an excess of ammonium persulfate over the amount required to convert the iron and cerium ions present to the higher oxidized state, heating the solution to approximately the boiling point thereof and filtering off the insoluble compounds of iron and cerium so formed.

ALBERT E. BALLARD.
LAWRENCE E. MARTINSON.